United States Patent [19]

Curbishley et al.

[11] Patent Number: 4,587,700

[45] Date of Patent: May 13, 1986

[54] METHOD FOR MANUFACTURING A DUAL ALLOY COOLED TURBINE WHEEL

[75] Inventors: George Curbishley, Mesa; George S. Hoppin, III, Scottsdale, both of Ariz.

[73] Assignee: The Garrett Corporation, Los Angeles, Calif.

[21] Appl. No.: 618,619

[22] Filed: Jun. 8, 1984

[51] Int. Cl.$^4$ .................. B21K 3/04; B23P 15/04; B22F 5/04; F01D 5/00

[52] U.S. Cl. .................. 29/156.8 R; 29/156.8 B; 29/527.6; 29/558; 29/DIG. 31; 219/121 LN; 228/141.1; 228/160; 228/174; 228/193; 416/95; 416/181; 416/213 R; 416/229 R; 419/8; 419/28; 419/49; 430/299

[58] Field of Search .................. 29/156.8 R, 156.8 B, 29/527.6, 557, 558, DIG. 16, DIG. 31, DIG. 48, DIG. 4, DIG. 5; 219/121 ED, 121 LD, 121 LJ, 121 LN; 228/141.1, 160, 174, 193; 416/95, 97 R, 97 A, 181, 213 R, 213 A, 244 A, 229 R, 229 A; 419/8, 28, 49; 430/299, 318, 320

[56] References Cited

U.S. PATENT DOCUMENTS

| | | | |
|---|---|---|---|
| 2,786,646 | 3/1957 | Grantham | 416/92 |
| 3,515,499 | 6/1970 | Beer et al. | 416/95 |
| 3,584,972 | 6/1971 | Bratkovich | 416/229 A |
| 3,606,572 | 9/1971 | Schwedland | 416/97 |
| 3,606,573 | 9/1971 | Emmerson et al. | 416/97 |
| 3,781,130 | 12/1973 | Tall | 416/97 |
| 3,872,563 | 3/1975 | Brown et al. | 29/156.8 B X |
| 3,927,952 | 12/1975 | Kirby | 416/95 |
| 3,942,231 | 3/1976 | Whitaker | 29/156.8 B |
| 4,063,939 | 12/1977 | Weaver et al. | 29/156.8 R X |
| 4,071,184 | 1/1978 | Carlson et al. | 29/156.8 B X |
| 4,096,615 | 6/1978 | Cross | 29/156.8 R |
| 4,152,816 | 5/1979 | Ewing et al. | 29/156.8 R |
| 4,270,256 | 6/1981 | Ewing | 29/156.8 R |
| 4,472,866 | 9/1984 | Moracz et al. | 29/156.8 B |

Primary Examiner—Howard N. Goldberg
Assistant Examiner—Ronald S. Wallace
Attorney, Agent, or Firm—J. Richard Konneker; Albert J. Miller

[57] ABSTRACT

A dual alloy cooled turbine is manufactured by casting a hollow cylinder of first nickel-base alloy material with high creep resistance to produce directionally oriented grain boundaries. A preform of a second nickel-base alloy material with high tensile strength and high low-cycle-fatigue strength is diffusion bonded into the bore of the hollow cylinder by subjecting the cylinder and preform to hot isostatic pressing. The resulting cylindrical block is cut into thin precisely flat wafers. A plurality of alignable holes for forming fluid cooling passages are photochemically etched into the individual wafers. The wafers then are laminated by vacuum diffusion bonding techniques, with the holes aligned to form fluid cooling passages. The resulting laminated block is machined to produce the turbine wheel with turbine blades through which the cooling passages extend.

27 Claims, 10 Drawing Figures

METHOD FOR MANUFACTURING A DUAL ALLOY COOLED TURBINE WHEEL

BACKGROUND OF THE INVENTION

The invention relates to dual alloy turbine wheels and, more particularly to dual alloy cooled turbine wheels and methods of manufacture thereof.

Various dual alloy turbine wheels are used instead of single alloy turbine wheels in applications in which exceptionally high speed, high temperature operation is needed, since under these circumstances it is necessary to have high creep rupture strength at high temperatures in the blade or outer rim portion of a well designed turbine disk, and it is also necessary under high speed, high temperature conditions to have superior tensile strength and low-cycle-fatigue properties in the hub portion. Superalloy materials which have the former highly desirable characteristics in the blade and outer rim portions of a turbine wheel do not have the high tensile strength and low-cycle-fatigue resistance properties that are required in the hub, and vice-versa. In general, all the desirable qualities for turbine wheel hubs are associated with tough, fine-grained, nickel-base alloys, in contrast to the desired properties of the material of the blade, ring, or rim portions of a turbine disk, in which large-grained, nickel-base alloys with directional structures in the blades are used. The large grained, directional structure alloys possess high creep resistance, but inferior tensile properties.

Where the performance compromises necessitated by use of a single alloy material in a turbine disk are unacceptable, dual alloy turbine wheels have been used for many years, for example, in connection with military engines which utilize AISI Type 4340 alloy steel hubs fusion welded to Timken 16-25-6 warm-worked stainless steel rims, the alloys of which could be fusion-welded to yield joints of adequate strength. More modern, stronger, more complex alloys, however, could not be fusion-welded in typical disk thicknesses without unacceptable cracking. Inertia-welding processes have been used in joining of axial-flow compressor disks into spools and in joining of dissimilar metal shafts to turbine wheels. However, the largest existing inertia welding machines are only capable of welding joints in nickel-based alloys which are a few square inches in cross section, so this process can be used only in the smallest turbine disks.

The bonding of dissimilar metals by hot isostatic pressing (HIP) has been suggested for manufacture of dual alloy turbine wheels, since this process does not have the inherent joint size limitations of the inertia-welding process. Hot isostatic pressing is a process in which the pressure is applied equally in all directions through an inert argon gas in a high temperature pressure vessel or autoclave. Cross Pat. No. 4,096,615, Ewing et al., Pat. No. 4,152,816, and Catlin Pat. No. 3,940,268 are generally indicative of the state of the art for hot isostatic pressing as applied to manufacture of dual alloy turbine wheels. Kirby Pat. No. 3,927,952, assigned to the present assignee, is indicative of the state of the art in manufacture of cooled turbine disks and discloses photochemically etching recesses in thin single alloy disks to produce corresponding holes which are aligned when the disks are subsequently vacuum diffusion bonded together to create a laminated structure in which fluid cooling passages extend from a central bore of the hub to and through the turbine blades.

Cooled turbine discs are necessary in small, high-temperature gas turbine components that are subjected to exceedingly high external gas temperatures, wherein the blade metal temperatures may reach the range of 1700 to 1800 degrees Fahrenheit. The cooling passages are necessary to prevent the blades from exceeding this temperature range in order to prevent excessive creep of the blade material.

The above mentioned dual alloy turbine wheels have become attractive because their optimum material properties in both the hub portion area and the ring and blade portion of turbine disks have allowed the minimization or elimination of cooling fluid requirements and have allowed lighter weight turbine disks to be utilized. However, there nevertheless remains a need for an ultra-high performance dual alloy turbine wheel that is capable of operating in conditions that would produce unacceptably high blade temperatures even in the best prior art uncooled dual alloy turbine wheels.

Accordingly, it is object of this invention to provide an ultra-high performance turbine wheel and a practical method of manufacture thereof which has all of the advantages of prior dual alloy turbine wheels and further provides suitable fluid cooling passages to the blades of the disk.

SUMMARY OF THE INVENTION

Briefly described, and in accordance with one embodiment thereof, the invention provides a high performance, cooled, dual alloy turbine wheel and method of manufacture thereof, wherein a hollow cylinder of first superalloy material having high creep rupture strength up to approximately 1800 degrees Fahrenheit is cast against a chill to produce a radial directional grain structure; the hollow cylinder then is filled with second superalloy material having the properties of high tensile and high low-cycle-fatigue strengths, after which deformable plates are bonded to the cylinder to tightly seal the second superalloy material therein and the assemblage then is subjected to hot isostatic pressing to achieve direct metallurgical diffusion bonding of the second superalloy material to the cast cylinder; the resulting dual alloy cylinder then is sliced into a plurality of thin, precisely flat dual alloy wafers or laminae, which are cut to produce cooling holes, and then are reassembled to produce a laminated cylinder from which the cooled dual alloy turbine wheel can be machined. In the described embodiment of the invention, the first superalloy material of which the cast cylinder is formed consists of MAR-M247 alloy and the second superalloy is in the form of a pre-consolidated preform composed of powder metal low carbon Astroloy material. After the hot isostatic pressing, the resulting dual alloy cylinder is machined to produce a precise cylinder. Slicing of the resulting dual alloy cylinder into wafers is accomplished by a process that results in precisely flat wafers. Photochemical etching or laser cutting techniques are used to cut cooling holes in locations at which the turbine blades will be formed later. The wafers are coated with elemental boron or a nickel-boron alloy, aligned so that their respective cooling holes form fluid cooling passages, and are subjected to hot axial pressing to vacuum diffusion bond the wafers together to produce the laminated structure. The laminated structure then is appropriately heat treated and inspected, and machined using conventional techniques to form the turbine blades and other features of the turbine wheel. Extremely high creep strength is achieved in the blade material. Extremely high tensile strength and high low-cycle-fatigue strength are achieved in the hub portion of the turbine wheel. These properties result in an extremely high performance turbine wheel that can withstand very high temperature, high speed operation.

DETAILED DESCRIPTION

Figure 1:
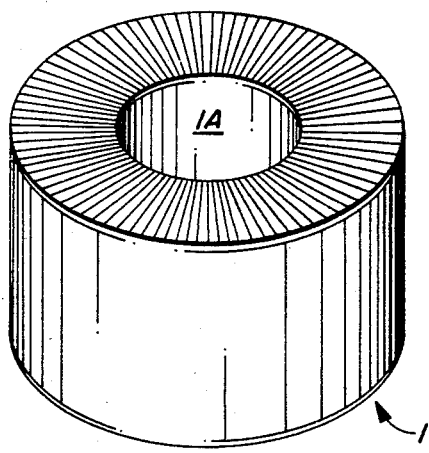
FIG. 1 is perspective view of a cast hollow cylinder of superalloy material having high creep rupture strength, in accordance with the present invention.

Referring now to the drawings, reference numeral 1 in FIG. 1 designates a cast hollow cylinder. Cylinder 1 is cast of a material having very high creep rupture strength. A suitable material would be a nickel-based superalloy material, such as MAR-M247 material. Preferably, the procedure of casting cylinder 1 would be to cast it against a chill (i.e., by providing a chilled copper outer mold wall against which the outer portion of the cast, molten alloy metal presses so that the outer portions of the molten metal rapidly freeze, producing radial, directional solidification. The radial lines shown in FIG. 1 on the top of cylinder 1 indicates the resulting radial grain structure. This results in maximum creep rupture strength. Note that this first step (of casting cylinder 1) is designated by reference numeral 35 in the process flow chart of FIG. 9.

The next step in the process is to precisely machine the cylindrical hole 1A in cylinder 1 so that a very close fit can be provided against the surface of a hub preform. The hub preform is designated by reference numeral 2 in FIG. 2. As mentioned above, the hub portion of the turbine wheel being manufactured needs to have maximum low-cycle-fatigue and high tensile strength properties. A suitable preform 2 having these properties can be composed of preconsolidated powder metal low carbon Astroloy, a fine grained superalloy material.

The outer diameter face of preform 2 is machined to achieve a precise fit into the machined cylindrical hole 1A into cast cylinder 1. Subsequent to machining the outer diameter of preform 2, it is inserted into the center of the cast cylinder 1. This step is indicated in block 36 of FIG. 9. Normally, hub preform 2 would be manufactured by hot isostatic pressing techniques to make a cylindrical "log" from which the preforms 2 are machined. After the precise fit has been achieved, the two deformable end plates 3 and 4 are peripherally bonded to cast cylinder 1. The bonding can be achieved by the known technique of electron beam welding, which produces electron beam weld spikes 5 to affix and seal the deformable plates 2 and 4 to the cylinder 1. A secondary seal around the preformed hub 1 and deformable plates 3 and 4 is accomplished by brazing the outer circumference of deformable plates 3 and 4 to produce activated diffusion bonding that provides the additional seals designated by reference numerals 6 and 7. This step is recited in block 37 in the flow chart of FIG. 9. The electron beam welding techniques and peripheral brazing techniques are well known and can be easily provided by those skilled in the art. The deformable plates 3 and 4 can be composed of Inconel 625 sheets, which are typically 0.040–0.080 inches thick.

Figure 2:
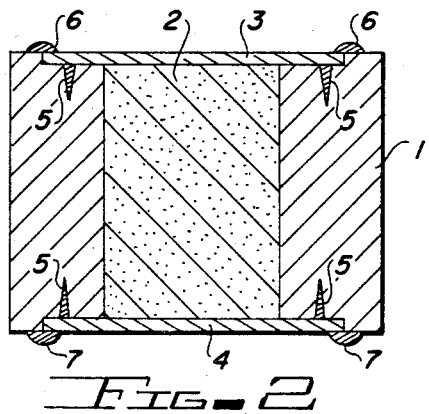
FIG. 2 is a section view of a subsequent step in the manufacture of the present invention illustrating placement of a second alloy preform in the cylinder of FIG. 1 and attachment of sealing end caps to prepare the assemblage for hot isostatic pressing.
Figure 9:
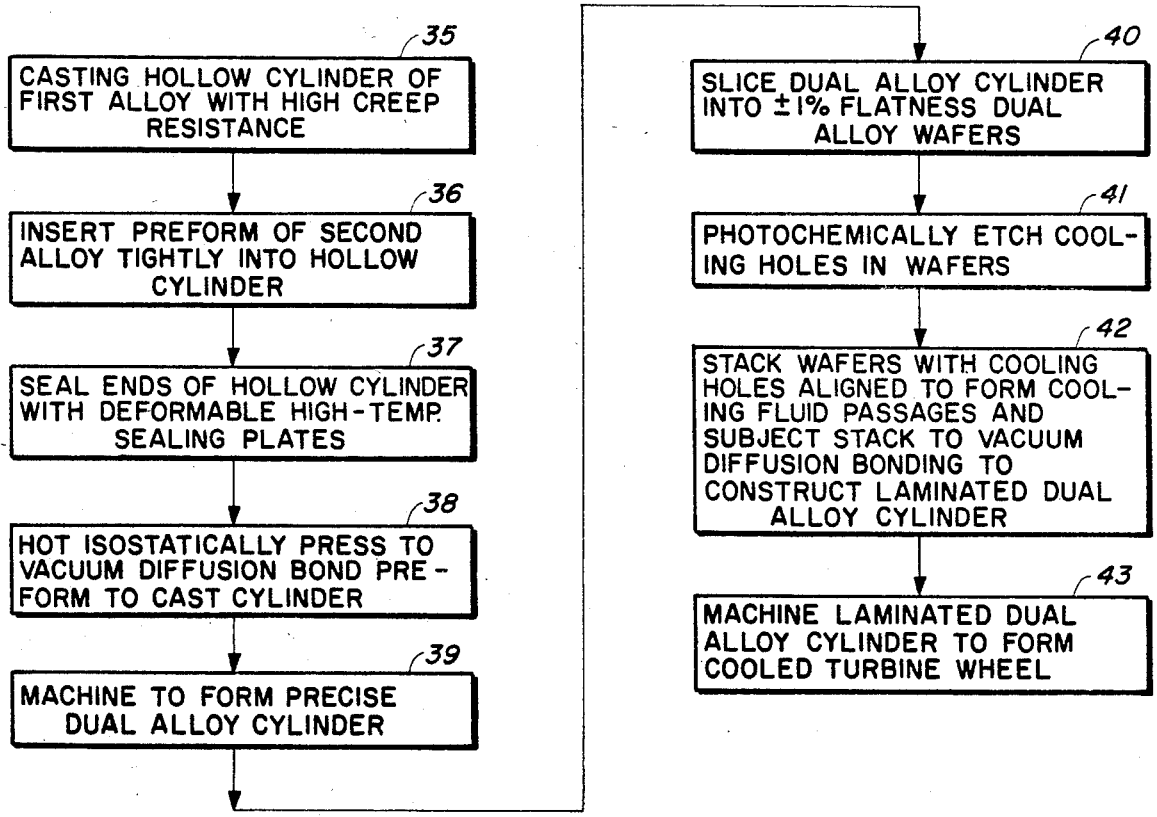
FIG. 9 is a flow diagram useful in explaining the manufacturing process of the present invention.

As indicated in block 38 of the flow chart of FIG. 9, the next step is to hot isostatically press the assemblage of FIG. 2 in order to achieve vacuum diffusion bonding of hub preform to cast cylinder 1. The hot isostatic pressing procedure would typically be performed for four (4) hours at 15,000 psi pressure and 2200° F. temperature. Activated diffusion bonding is described in detail in the November 1970 welding research supplement of the Welding Journal of the American Welding Society at pages 505-S to 509-S by George Hoppin III, and T. F. Berry, also incorporated herein by reference.

Figure 4:
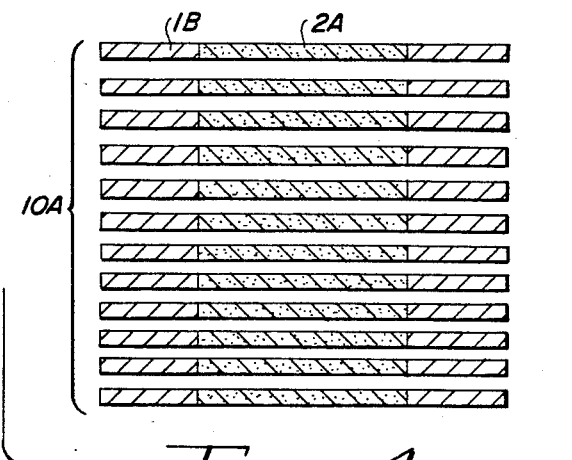
FIG. 4 illustrates slicing of the dual alloy cylinder of FIG. 3 into thin, precisely flat dual alloy wafers.
Figure 5:
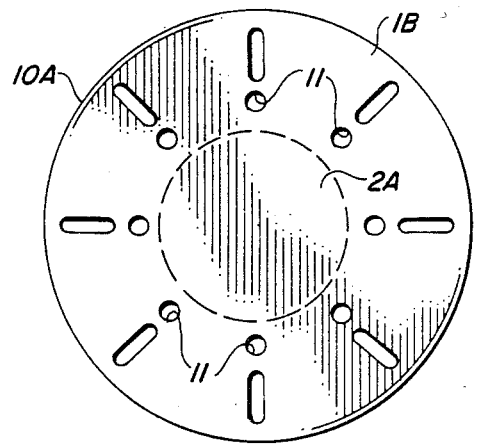
FIG. 5 is a plan view illustrating one of the dual alloy wafers of FIG. 4 after photochemical etching thereof to produce fluid cooling holes and illustrating the wrought alloy hub and the cast alloy blade sections thereof.

As indicated by block 39 in the flow chart of FIG. 9, the next step in the process for making the dual alloy cooled turbine wheel of the present invention is to machine the ends of the block illustrated in FIG. 2 and formed by the hot isostatic pressing procedure in order to remove the deformable end plates 3 and 4 and produce a machined cylindrical "log" designated by reference numeral 10 in FIG. 5 and having a rectilinear cross section. This rectilinear log is then suitable for the subsequent step which, as indicated in block 40 of FIG. 9, is to slice the dual alloy cylinder 10 into a large number of thin, extremely flat dual alloy wafers or laminae, generally designated by reference numeral 10A in FIG. 4. Typically, the thickness of each of the wafers 10A might be in the range from 0.020 to 0.040 inches. Reference numeral 1B in FIG. 4 designates the outer alloy portion of the wafers 10A, which has the desired high creep rupture strength needed in the turbine blades, while reference numeral 2A designates the hub portion having the desired fine grained alloy structure with high low-cycle-fatigue and high tensile strength properties.

Figure 3:
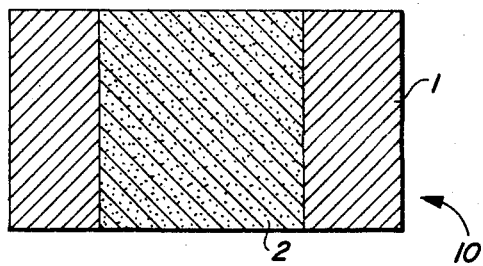
FIG. 3 illustrates a section view of the resulting dual alloy cylinder after machining thereof to form a precise cylindrical block.

The degree of flatness required for the wafers 10A is quite high; a flatness of approximately plus or minus one percent of the wafer thickness is desirable. This is in contrast with aircraft engine industry normal standards for sheet thickness, where the tolerance is ±10%. Various techniques could be used for slicing the dual alloy block 10 of FIG. 3 into the wafers 10A. The presently preferred technique is to use "wire EDM" (electrical discharge machining) devices which are widely used to obtain precise cutting of metals.

Figure 6:
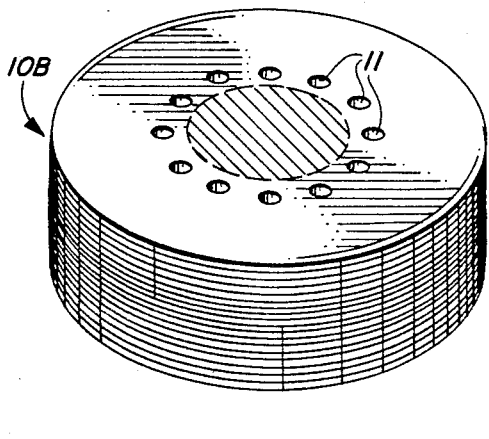
FIG. 6 is a perspective view of the laminated dual alloy cylinder with cooling passages formed therein.

As indicated in block 41 of the flow chart of FIG. 9, the next step in the manufacturing process of the present invention is to photochemically machine each of the dual alloy disks 10A to produce the fluid cooling passages that will be needed in the turbine blades of the turbine wheel ultimately produced by the process of the present invention. Reference numerals 11 in FIG. 5 generally designate a particular group of such cooling fluid holes that form a portion of one of such cooling passages which will ultimately extend through one of the subsequently formed turbine blades. Alternately, other machining techniques could be used, such as laser cutting to produce the fluid cooling holes 11. In FIGS. 5 and 6, holes 11 are the air inlets for the respective blades of the turbine wheel being manufactured. Each air inlet hole 11 extends through a path, which may be quite complex, in a separate blade of the turbine wheel.

Next, as indicated by block 42 in FIG. 9, it is necessary to align the corresponding fluid cooling passages 11 in all of the dual alloy disks 10A so that the fluid cooling passages of the turbine wheel are formed. The disks 10A are all laminated together to produce the reconstructed dual alloy block designated by reference numeral 10B in FIG. 6. As mentioned in the above referenced Kirby Pat. No. 3,927,952, (which is owned by the present assignee and is incorporated herein by reference) the laminated rectangular block 10B can be formed of the thin wafers 10A by coating them with a suitable braze or diffusion bonding alloy, which can be applied in various ways, such as by spraying, dusting, or placing a brazed alloy foil between the adjacent wafers. A preferred technique is to deposit elemental boron in carefully controlled amounts by chemical vapor deposition. The coated wafers then are stacked in a predetermined order, with the fluid cooling holes 11 properly aligned, and are subjected to a vacuum diffusion bonding process at a suitable elevated temperature, such as 2200° Fahrenheit under a suitable axial pressing force (10-100 psi).

Figure 7:
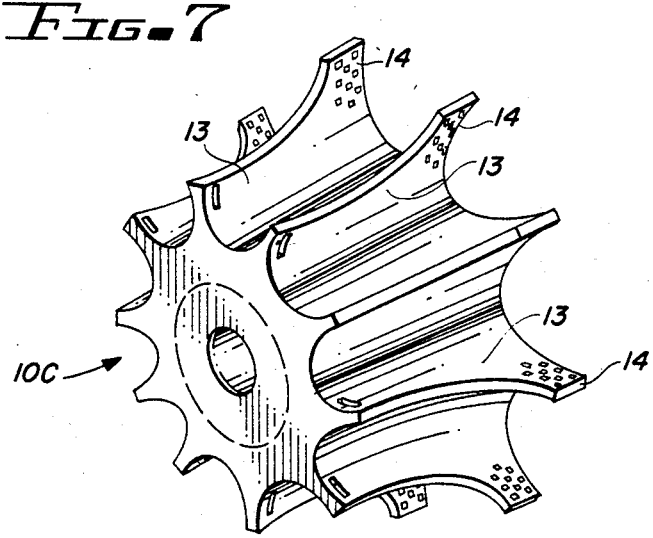
FIG. 7 is a perspective view illustrating a completed radial flow turbine wheel formed by machining the laminated cylinder of FIG. 6.

After appropriately heat treating and inspecting the resulting "log" 10B of FIG. 6, the final step in the manufacturing process of the present invention is to utilize conventional machining techniques to produce a cooled, dual alloy turbine wheel, such as the radial flow turbine wheel, designated by reference numeral 10C in FIG. 7, wherein reference numeral 13 generally designates the blades. Reference numeral 14 generally designates the ends of some of the fluid cooling passages in the blades of the final turbine wheel that are obtained by the above-mentioned photochemical machining of holes 11 in the dual alloy discs 10A and proper alignment thereof during the vacuum diffusion bonding procedure by which laminated cylinder 10B is formed.

Figure 8A:
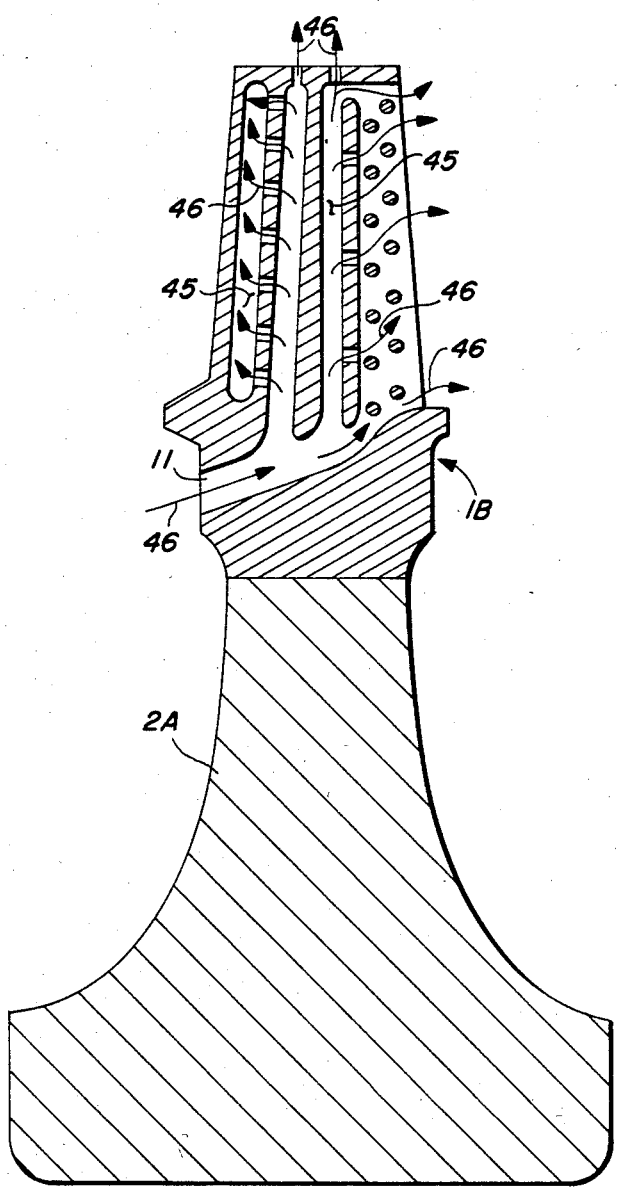
FIG. 8A is a section view of one blade of a cooled axial flow turbine wheel made in accordance with the method of the present invention.
Figure 8B:
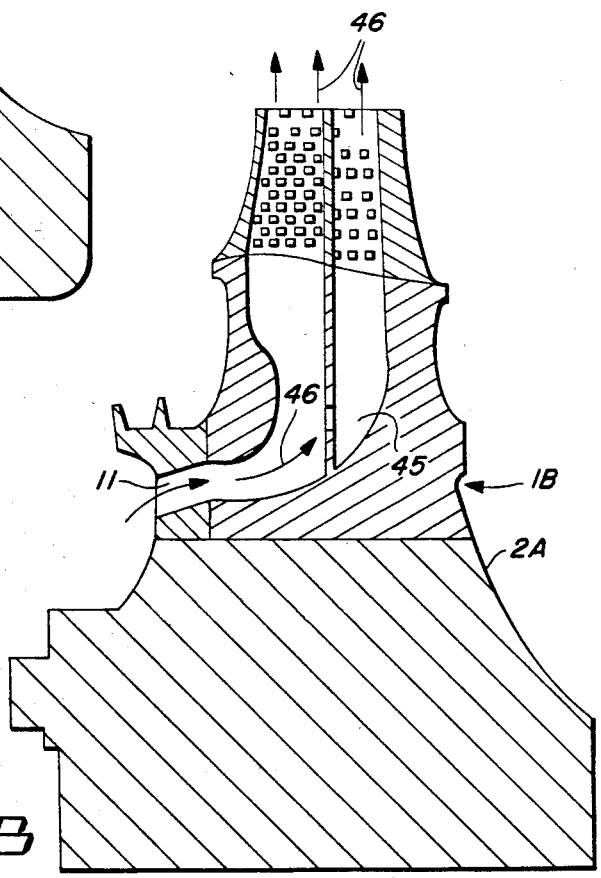
FIG. 8B is a section view of one blade of another cooled axial flow turbine wheel made in accordance with the invention.

Although the above example leads to the construction of the cooled radial flow turbine wheel of FIG. 7, the same techniques can be applied to the manufacture of axial flow turbine wheels. FIGS. 8A and 8B show section views of blades of two such cooled axial flow turbine wheels. In FIG. 8A, reference numeral 2A designates high tensile strength, high low-cycle-fatigue strength material of the hub portion of an axial flow turbine wheel. Reference numeral 1B generally designates the high creep strength blade portion of the turbine wheel. Reference numeral 11 designates the cooling air inlet of the blade, leading to a complex network of air passages 45 formed by properly aligned cooling holes in the various laminated disks. The arrows 46 indicate the general direction of cooling air flow in the passages 45. The cooling air is exhausted from outlets at the tip and the trailing edge of the blade and through "showerhead" holes in the leading edge of the blade (not shown in FIG. 8A). FIG. 8B shows another section view of the blade of a simpler axial flow turbine wheel, wherein the cooling passages extend from the inlet 11 to outlets only at the tip of the blade.

Thus, the invention provides a dual alloy turbine wheel that has optimum materials and cooling circuits for a cooled integral turbine wheel. The method also provides a practical method of manufacture of the turbine wheel. The turbine wheel of the present invention should provide significant advantages for certain small, extremely high speed, high temperature turbine engines.

While the invention has been described with reference to a particular embodiment thereof, those skilled in the art will be able to make various modifications to the described embodiment of the invention without departing from the true spirit and scope thereof. It is intended that elements and steps which are equivalent to those disclosed herein in that they perform substantially the same function in substantially the same way to achieve substantially the same result be encompassed within the invention.

For example, it is not essential that the hub preform 2 be sliced along with the annular cast cylinder 1, since no cooling holes are needed in the hub. Therefore, the annular cast cylinder 1 as shown in FIG. 1 could be sliced to produce wafers or disks in which cooling passage holes are cut, as by photochemical etching. These etched disks can be laminated to reconstruct the annular cylinder 1, and the hub preform 2 then can be inserted into the hole (corresponding to 1A in FIG. 1) of the reconstructed annular cost cylinder and attached thereto by diffusion bonding.

We claim:

1. A method of manufacturing a cooled dual alloy turbine wheel having a hub portion and a plurality of thin blades projecting radially outwardly from said hub portion, said method comprising the steps of:
   (a) providing a hollow cylinder of first superalloy material having high creep rupture strength up to a temperature of approximately 1800 degrees Fahrenheit, said hollow cylinder having an axial hole therein;
   (b) filling said hole with second superalloy material having the properties of high tensile strength and high low-cycle-fatigue strength;
   (c) bonding a first imperforate deformable plate to said cylinder to cover said hole and tightly seal said second superalloy material in said hole;
   (d) subjecting said sealed cylinder and second superalloy material therein to hot isostatic pressing at a predetermined temperature and a predetermined pressure to effect direct metallurgical diffusion bonding of said second superalloy material to the cast first superalloy material of said cylinder to form a unitary dual alloy cylinder;
   (e) transversely slicing said cylinder into a plurality of relatively thin, precisely flat wafers;
   (f) forming a plurality of cooling holes in each of said wafers at predetermined locations thereof;
   (g) aligning and stacking said wafers and subjecting them to axial pressing at a predetermined temperature to vacuum diffusion bond said wafers into a laminated dual alloy cylinder with fluid cooling passages extending blade locations in said laminated dual alloy cylinder whereat said thin blades are to be subsequently formed; and (h) machining said laminated dual alloy cylinder to produce said thin blades, said fluid cooling passages extending through various ones of said blades, respectively, to form said cooled dual alloy turbine wheel with blades having high creep rupture strength up to approximately 1800 degrees Fahrenheit and with said hub having an ultimate tensile strength of at least 150,000 psi.

2. The method of claim 1 wherein step (a) includes casting said first superalloy material against a chill to produce large radially oriented grain boundaries that result in high creep rupture strength in the blades of said turbine wheel.

3. The method of claim 1 wherein step (c) includes bonding a second imperforate deformable plate to an opposite end of said hole to tightly seal said second superalloy material in said hole.

4. The method of claim 3 wherein said second superalloy material is in the form of a pre-consolidated powder preform and step (b) includes positioning said preform in said hole to produce an essentially zero tolerance fit between said preform and the wall of said hole.

5. The method of claim 4 wherein step (f) includes photochemically etching said cooling holes in said wafers.

6. The method of claim 5 wherein said first superalloy material is a cast nickel-based superalloy material.

7. The method of claim 6 wherein said second superalloy material is preconsolidated powder metal low carbon Astroloy material.

8. The method of claim 3 including bonding said first and second imperforate deformable plates to said cylinder by electron beam welding to effect a vacuum seal between said cylinder and said first and second imperforate deformable plates, respectively.

9. The method of claim 3 including bonding said first and second imperforate deformable plates to said cylinder by brazing to effect a vacuum seal between said cylinder and said first and second imperforate deformable plates, respectively.

10. The method of claim 1 wherein said hot isostatic pressing is conducted in an autoclave at a temperature of approximately 2200 degrees Fahrenheit at a pressure of at least approximately 15,000 pounds per square inch.

11. The method of claim 2 wherein said first superalloy material is a cast nickel base superalloy containing a relatively high proportion of gamma-prime forming elements and said second superalloy material is a wrought nickel base superalloy of a lower proportion of gamma-prime forming elements then said first superalloy material.

12. The method of claim 1 wherein steps (e), (f) and (g) are performed before step (b).

13. A method of manufacturing a cooled dual alloy turbine wheel having a hub portion and a plurality of thin blades projecting radially outwardly from said hub portion, said method comprising the steps of:
(a) producing a hollow cylinder of first superalloy material having high creep rupture strength, said hollow cylinder having an axial hole therein;
(b) filling said hole with second superalloy material having the properties of high tensile strength and high low-cycle-fatigue strength and permanently bonding said second superalloy material to said first superalloy material;
(c) slicing said cylinder into a plurality of relatively thin, precisely flat wafers;
(d) forming a plurality of cooling holes in each of said wafers at predetermined locations thereof;
(e) aligning and stacking said wafers and bonding said wafers into a laminated dual alloy cylinder with fluid cooling passages extending through blade locations in said laminated dual alloy cylinder whereat said thin blades are to be subsequently formed; and
(f) machining said laminated dual alloy cylinder to produce said thin blades, said fluid cooling passages extending through various ones of said blades, respectively, to form said cooled dual alloy turbine wheel with blades having high creep rupture strength and with said hub having high low-cycle-fatigue and tensile strengths.

14. The cooled, dual alloy turbine wheel of claim 13 wherein said first superalloy material of said peripheral blade portion is cast against a chill to produce large, radially oriented grain boundaries that result in high creep rupture strength in said thin blades.

15. A method of manufacturing a cooled turbine wheel having a hub portion from which a plurality of blades outwardly extend, said method comprising the steps of:
(a) providing a plurality of thin metallic laminae each having a central portion with a high tensile strength and a high low cycle fatigue strength and a contiguous peripheral portion having high creep rupture strength by forming the central portion and the peripheral portion during separate steps and then diffusion bonding an outer edge of the central portion to an inner edge of the peripheral portion;
(b) forming holes through said laminae;
(c) intersecuring said laminae in a stacked relationship in which said holes are relatively oriented to define at least one cooling passage extending through the stacked laminae; and
(d) removing part of the said peripheral portions of said laminae to define, in the stacked laminae, said blades.

16. The method of claim 15 wherein step (b) includes forming said holes in said peripheral portions of said laminae.

17. The method of claim 15 wherein step (a) includes obtaining said plurality of thin metallic laminae by providing a hollow cylinder of first superalloy material and providing within said hollow cylinder of second superalloy material a close fitting solid cylinder of second superalloy material, bonding said first superalloy material and said second superalloy material together along the entire interface between said hollow cylinder and said solid cylinder to form a solid dual alloy cylinder, and slicing said solid dual alloy cylinder to thereby produce said thin metallic laminae.

18. The method of claim 17 wherein step (a) also includes the step of casting said first superalloy material against a chill to obtain said hollow cylinder.

19. The method of claim 18 wherein said solid cylinder of second superalloy material is composed of preconsolidated powder metal low carbon Astroloy material.

20. The method of claim 19 wherein step (b) includes forming said holes by photochemical etching.

21. The method of claim 20 wherein said intersecuring includes subjecting said laminae to hot axial pressing to vacuum diffusion bond said laminae together, said laminae being aligned so that said holes define a plurality of cooling passages, at least one extending through each of said blades.

22. A method of manufacturing a cooled turbine wheel having a hub portion from which a plurality of blades outwardly extend, said method comprising the steps of:
(a) providing a central metallic hub portion having high tensile strength and high low-cycle-fatigue strength;
(b) providing a plurality of thin, annular metallic laminae each having high creep rupture strength;
(c) forming holes through said laminae;
(d) intersecuring said laminae in a stacked relationship in which said holes are relatively oriented to define at least one cooling passage extending through the stacked laminae;
(e) securing the inner edges of said laminae to said central metallic hub portion; and
(f) removing part of said peripheral portions of said laminae to define, in the stacked laminae, said blades.

23. The method of claim 22 wherein said hub portion is a solid cylinder composed of preconsolidated powder metal low carbon Astroloy material.

24. The method of claim 23 wherein step (b) includes obtaining said annular metallic laminae by casting first superalloy material against a chill to produce a hollow cylinder, and slicing said hollow cylinder to thereby provide said annular metallic laminae.

25. The method of claim 24 wherein step (c) includes forming said holes by photochemical etching.

26. The method of claim 25 wherein step (d) includes diffusion bonding said laminae together.

27. The method of claim 26 wherein step (e) includes diffusion bonding the inner edges of said laminae to said central metallic hub portion.

* * * * *